United States Patent [19]

Ballas, Sr.

[11] 4,114,269
[45] Sep. 19, 1978

[54] ROTARY CUTTING ASSEMBLY

[75] Inventor: George Charles Ballas, Sr., Houston, Tex.

[73] Assignee: Weed Eater, Inc., Houston, Tex.

[21] Appl. No.: 747,318

[22] Filed: Dec. 3, 1976

[51] Int. Cl.² .................... A01D 35/26; A01G 3/06
[52] U.S. Cl. ...................................... 30/276; 56/12.7
[58] Field of Search ................. 30/276, 347; 56/12.7, 56/295; 51/377; 403/349

[56] References Cited

U.S. PATENT DOCUMENTS

| 1,307,017 | 6/1919 | Movshovitch | 51/377 |
| 1,954,051 | 4/1934 | Moon | 403/349 X |
| 3,623,281 | 11/1971 | Moffat | 51/377 |
| 3,831,278 | 8/1974 | Voglesonger | 30/347 X |
| 3,859,776 | 1/1975 | Ballas et al. | 56/295 X |

Primary Examiner—Jimmy C. Peters

[57] ABSTRACT

Apparatus for cutting, trimming, and edging vegetation, and the like, is provided with a rotatable disc-like head having at least one string-like cutting member removably attached thereto and replaceably extending from its periphery for cutting adjacent vegetation and the like. A unitary metallic bearing element for enhancing the cutting life of the cutting string is provided, as well as a keyway system for attaching a spool of cord or line to said head for rotation therewith.

24 Claims, 10 Drawing Figures

ROTARY CUTTING ASSEMBLY

BACKGROUND OF INVENTION

This invention relates to apparatus for cutting vegetation and the like, and more particularly relates to improved methods and apparatus for cutting vegetation with a flexible non-metallic cord or line member.

It is well known to cut or mow grass, weeds and other vegetation with a moving flail-like member, and it is now well known to employ a flexible non-metallic cord member for the purpose of cutting vegetation located in places which are inaccessible to apparatus employing a rigid steel blade. In particular, the trimmer which is marketed in various forms under the trademark WEED EATER, and which is now described in U.S. Pat. No. 3,708,967; No. 3,826,068; and No. 3,859,776; is widely known and used for this purpose.

This invention relates to an improved cutting assembly in the form of a rotary head for a rotary edger, trimmer or the like. The preferred embodiment is in the form of a portable hand-held type mowing and edging tool wherein the cutting element is safe in most uses and avoids the hazardous conditions created by prior art devices.

The prior art is prolix with attempts at solutions to provide a safe, efficient and simply constructed rotary head for rotary mowers, edgers, trimmers and the like. One attempt comprises a rotating metal bar or the like which is rotated at sufficient speed to effect cutting of grass, weeds or the like. However, such bars create hazardous conditions in that when they strike certain objects they act upon those objects in a fashion to create and project dangerous missiles which may strike the operator or individuals in the area of work.

Various attempts have been made to overcome the aforesaid hazardous conditions created with rigid-type metal cutting blades of the prior art. Most of these attempts to overcome the problem involve the utilization of some type of flexible flail which will have sufficient resiliency so as not to propel objects which are struck at high velocities. Most of these resilient type cutting elements of the prior art suffer a disadvantage in that they are not safe, and mere resiliency is not sufficient to insure that the dangerous conditions will not be created when rotation is effected at the desired cutting speed. Further, the prior art cutting elements are generally not provided with means for easy replaceability in the event of wearing out and are usually expensive to replace.

The result has been that most of the prior lawn and edging apparatus have been unsatisfactory because of the dangerous conditions created by the rotating head. As a consequence, most lawn edging and trimming around trees and the like, which would otherwise be damaged by the metal blades, must be done manually, which is both laborious and time consuming.

There is depicted and described in the following West German Petty Pat. Nos. 6,919,841; No. 6,919,842; No. 6,919,843; No. 6,919,844; No. 6,9348,265; No. 7,043,648 and No. 7,238,972, one or more embodiments of a lawn mowing or trimming device having a disc-like head member arranged to be rotated by an electric motor, and containing a spool which is housed therein in coaxial relationship to the shaft of the motor. A length of flexible non-metallic line is coiled about the spool, whereby its free travelling end extends generally peripherally from the spool and head, and whereby such free travelling end will be swung arcuately about upon actuation of the motor to cut adjacent vegetation in the manner of a flail.

Use of the German device has revealed that, under ideal operating conditions, it will cut or trim grass and other light-weight vegetation with reasonable effectiveness. Furthermore, it possesses the significant advantage that it is much safer to use than the more conventional cutters, in that it does not cause stones or other solid objects to be discharged in a dangerous manner, and it is almost completely incapable of causing any significant injury to persons or pets struck by the flail-like cutting string. In fact, it is a reasonable statement that the German device will actually cut substantially only the vegetation to which it is directed.

On the other hand, the German device is also subject to certain disadvantages of a magnitude such as to severely limit, if not destroy, its practical value. In the first place, it is largely effective to cut standing light-weight vegetation but is almost completely useless for any other task. In the second place, it will only cut such vegetation if growing relatively sparsely, and it cannot effectively handle even light-weight vegetation if encountered in a rank condition. A more serious disadvantage, however, is that in the German device the cutting string experiences a breakage rate which is so high as to nullify all of its advantages and to keep such a device from having much commercial value.

It will be readily apparent from a consideration of the teachings hereinafter provided that a cutting string, line or cord, which is free from internal flaws or other defects will not usually break except as a result of being struck against or across a relatively immovable object. The cutting string may, of course, be formed of a metal wire or heavy strap in order to provide it with a tensile strength sufficient to resist such impact, but such a string, line or cord, will create substantially the same dangerous conditions which exist when the cutting element is a rigid blade or the like. Thus, the safety advantages which are present with the German device are directly derived from the same design feature which is the reason for excessive string breakage, i.e., the fact that the cutter used by the German device is a light-weight plastic string having a relatively small diameter, and therefore having a relatively poor tensile strength.

These disadvantages of the prior art, and especially of the aforementioned German device, are overcome with the present invention, and commercially acceptable embodiments of a vegetation cutter and the like are herein provided which are not only fully capable of cutting vegetation under most operating conditions, but which are also fully capable of other tasks completely beyond the capabilities of the German device, such as the cleaning of dead leaves, trash and other such debris from along fences, walls and the trunks or stems of trees and bushes. More particularly, however, the embodiments of the present invention are capable of operation with a much higher efficiency and a much lower lower breakage rate for the cutting string.

SUMMARY OF INVENTION

This invention is for an improved cutting assembly for a rotary edger, trimmer or the like. It includes a body or head member arranged for rotation about an axis generally perpendicular with or normal to the cutting plane. It preferably includes one non-metallic cutting line attached to the body member for rotation therewith in the cutting plane, although a pair of lines may be effective for present purposes under proper circumstances. More particularly, provision is made via a unitary metallic bearing element having surfaces for the reduction of vibration between the cutting line and portions of the apparatus, and between adjacent portions of the coiled cutting line, and for higher speed and cutting efficiency.

The cutting line is characterized by having an effective working length to diameter radio, and of a material composition such as to render the line member flexible and yielding to the extent that it is substantially incapable of causing damage or injury when impacted against persons, animals, trees, etc. Preferably, the effective working length to diameter ratio of the line is on the order of 35:1. Certain embodiments of the invention include means for detachably securing the line or lines to the body member so that the same may be replaced after wear or breakage resulting from impact of the line against fences, trees, walls, etc., as well as vegetation. Provision is also made within the body member for storing additional cutting line in the nonworking or coiled condition whereby the effective working length of the line or lines may be lengthened at desired times as the working length becomes shortened due to breakage or fraying during use thereof. Certain embodiments of the invention further may have line storage means supported in the body member, which storage means are in the form of a spool which is provided with a keyway lock to secure the spool to the body member for rotation therewith, but which may be disengaged whereby additional line may be paid out to replace or replenish the effective working length of the cutting line when it becomes shortened during use. Another particularly significant feature is that the configuration of the cutting head includes a tear-drop shaped portion such as to prevent angular deformation of "kinking" of the cutting line, as will hereinafter be explained in detail.

In one particularly ideal embodiment of the present invention, a circular head member is provided which contains a single spool located concentrically therein in coaxial alignment with the motor shaft, the spool having a single strand centrally cound thereabout so as to present a free travelling end extending from the periphery of the head assembly. Alternatively, a pair of two separate strands may be wound about the spool to present two free ends as cutting members extending oppositely of each other from the periphery of the head assembly.

In addition to the various other problems of the devices of the prior art, it has also been discovered that excessive line breakage will occur from another cause not heretofore discussed. As hereinbefore explained, the subject cutting devices operate by revolving the circular cutting head at a relatively high velocity, whereby the cutting line is caused to be more or less rigidly and radially extended from the periphery of the head. During such revolvement, however, the line is caused to vibrate longitudinally as well as laterally.

As will hereinafter be explained and described in detail, the uncoiled or free travelling end of the cutting line tends to contact portions of the cutting head such as the walls of the peripheral apertures or "windows" in the rim of the cutting head. When the aforementioned longitudinal vibrations occur, the line tends to rub back and forth against these contact points. Although the surfaces of both the line and the walls of the cutting head are relatively quite smooth, there is considerable vibration nonetheless, and therefore heat is often generated to an extent such that the cutting line tends to melt. When this occurs, the melted portion of the line may adhere to the contacted surface of the head, and thereafter break, or the melting may itself create a weakening of the line whereby it will break off at that point.

Another important point of vibration may be found where the line is wound onto the spool, since the free travelling portion tends to move back and forth all along its length and not merely outwardly from the cutting head. Thus, vibration between the portion of the extended line which abuts or lies against the more immovable sections of the line which are coiled about the spool will also give rise to heat and thus melting of the line at these points. When melting of the line occurs here, the softened portion of the cutting line often tends to become welded to the other windings of the line on the spool, whereby breakage will often occur for this reason. Even if adjacent portions of line do not become welded or cemented together, melting of the line will itself create a weakness, and thus a breaking point, as hereinbefore explained.

It is a feature to reduce the vibration between the cutting line and any portion of the cutting device against which the cutting line is caused to rub. In a particularly suitable embodiment of the present invention, therefore, such vibration is reduced by providing that the nylon cutting line be disposed against a unitary metallic bearing element having surfaces preferably composed of brass or some other suitable metal or other substance.

It is another feature of this invention to provide for insulation or reduction of vibration between adjacent portions of the cutting string itself. In a particularly suitable embodiment of the present invention, the cutting line is preferably coated with a suitable viscous lubricant such as petroleum jelly or the like, as it is wound onto the spool which is thereafter mounted in the rotatable head. Accordingly, the coated windings are insulated and may be permitted to move back and forth freely against each other without the generating of heat in sufficient quantities to cause melting of the coiled cutting lines. Furthermore, addition of petroleum jelly to the cutting line is desirable to reduce vibration between the cutting line and bearing surfaces on the cutting head, even when such surfaces are composed of brass or some other appropriate material as hereinbefore described.

It is a further feature of the herein described invention to substantially reduce unravelling of the coiled line from the spool, and to keep the line in one fixed cutting plane. In a particularly suitable embodiment of the present invention, therefore, such unravelling is reduced by employing a guard element in surrounding relationship to the spool in order to maintain the coiled line portion therewithin.

In its broadest concept, any type of motor may be employed for purposes of the present invention to rotate the head assembly. However, an electric motor is cheaper and of lighter weight than a gasoline-driven engine and is therefore far more suitable for a cutting device intended to be employed in residential-size plots or areas, and the like, wherein lesser cutting capabilities are normally required. Accordingly, it is a particular feature to employ an electric motor having characteristics especially suitable for such purposes. For example, electric motors having glass bead filled nylon brushes offer many advantages that motors not so equipped lack. They have higher temperature resistance characteristics, wear better, have lower coefficients of friction, and are better able to withstand heat generated by arcing between brushes and the commutator, and heat generated by the resistance of the windings. Therefore, it is a feature to use an electric motor employing such nylon brushes.

Because electric motors operate at maximum efficiency only when properly ventilated, it is a feature to provide means for forcing air to circulate about the electric motor herein. It is also a feature to provide air inlet holes sufficiently far enough away from the motor and the grass cutting operation, that grass cuttings or other debris are not sucked into the air inlet holes.

These and other features and advantages of the present invention will become apparent from the following detailed description, wherein reference is made to the figures in the accompanying drawings.

DETAILED DESCRIPTION

Figures 1, 2, 3:
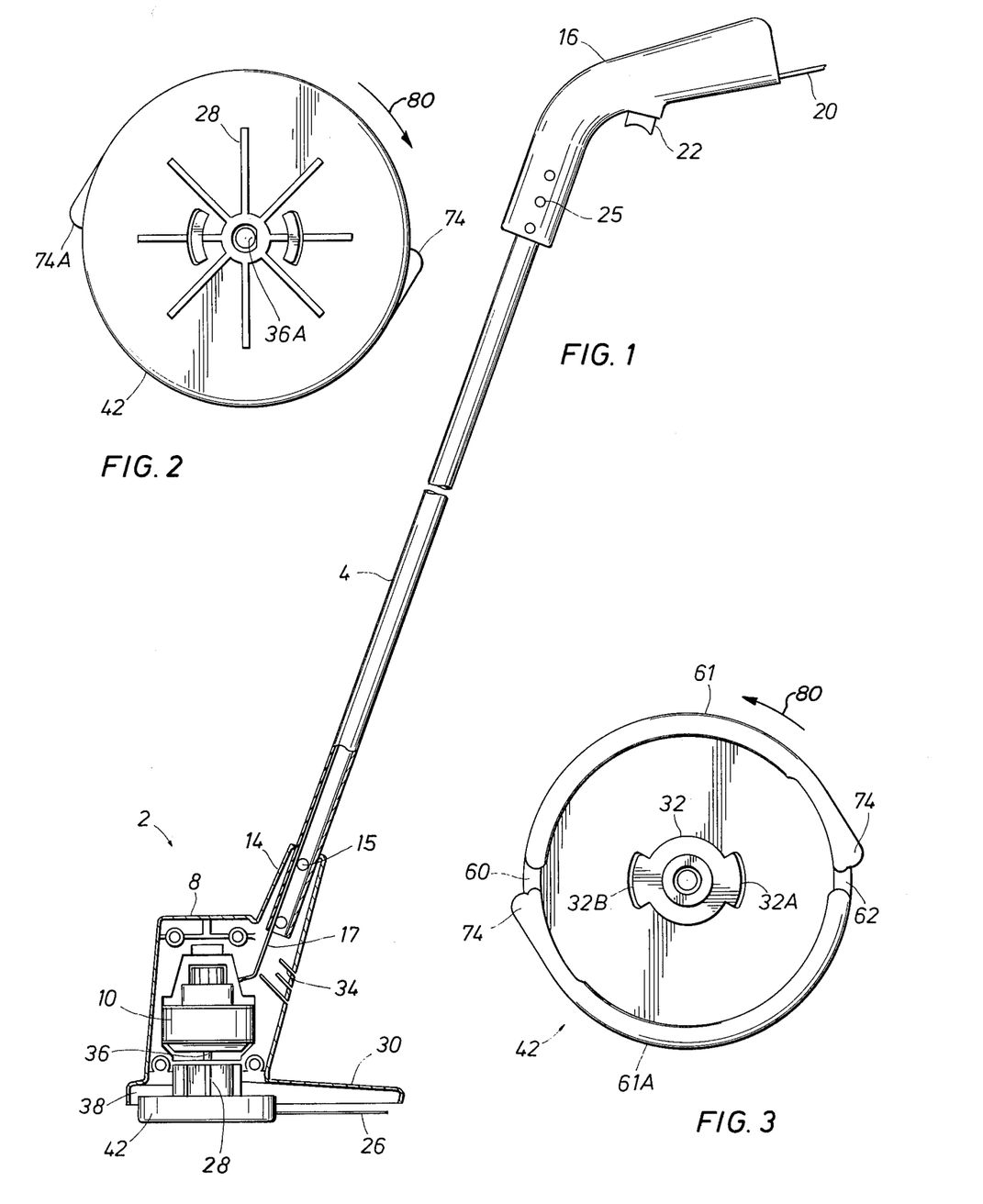
FIG. 1 is a pictorial side view, partly in cross-section, of the apparatus wherein the mechanical features and configuration of the apparatus are set forth in detail.
FIG. 2 is a top plan view of the head member depicted in FIG. 1.
FIG. 3 is a bottom plan view of the head member depicted in FIG. 2.

Referring now to FIG. 1, a portable type edging and trimming device generally designated by the numeral 2 is shown, and which is of the type preferred for lighter tasks in residential-size plots or areas, and the like, where electrical power is immediately and conveniently available to the operator. Accordingly, the apparatus may be composed of a tubular member 4 having a casing 8 containing electric motor 10 mounted at one end, which motor drives a string cutting head 42. The tubular member 4 is removably attached to and supports casing 8 by screws 15 insertable in shank 14. Such a device 2 is portable and is hand held and manipulated by an operator by means of trigger handle 16. Handle 16 is fixedly attached to the tubular member 4 by means of screws indicated generally at 25. Power may be applied to the motor 10 through a conventional electrical-type insulated cord or conductor 20, having an appropriate plug at one end (not shown), and having its other end passed through the tubular member 4 for connection with the motor 10 by means of connector 17. An appropriate ON-OFF switch or trigger 22 may conveniently be located adjacent the handle 16 at the upper end of the tubular member 4, for interconnection with the conductor 20 and motor 10. The cutting plane of the cutting string 26 may be easily arranged in either a horizontal or vertical position or tilted to any angle, to cut along sidewalks, around trees and rocks, and along fences and the like, where it is either unsafe or difficult to cut with conventional apparatus, merely by turning and manipulating handle 16. Referring more particularly to FIG. 1, there may be seen a hollow casing 8 or the like, with a single string circular cutting head 42 which is rotated by shaft 36 of electrical motor 10 of suitable design mounted within casing 8. The cutting head 42 may be further seen to include cutting strand 26 extending laterally from the cutting head 42 through either aperture 60 or 62 (FIG. 3) of suitable configuration, a distance which is a function of the present invention as will hereinafter be explained. As further indicated, the casing may have a flange portion or shield 30 for preventing the cutting head 42 from being brought into injurious contact with a wall or tree during its rotation by motor 10.

When the motor 10 is inactivated and the rotary head 42 is in a static condition, the cutting strand line 26 will tend to flexibly dangle from one of the equally spaced-apart window apertures 60 and 62 (FIG. 3) to the extent permitted by inherent characteristics of line 26. When the cutting head 42 is rotated at normal operating velocities, however, the line 26 will tend to stand out rigidly (but also flexibly and yieldably) from the periphery of the cutting head 42 as indicated in FIG. 1.

The electric motor 10 operates in an optimum manner when the air around it is allowed to be circulated or otherwise cooled. The hollow casing 8 effectively allows air to freely circulate around motor 10, therefore providing forced air circulation. The plurality of upstanding fins 28 located on the top of cutting head 42 and extending radially outward from the axis thereof provide forced circulation of air about motor 10 when motor 10 rotates head 42. Rapid rotation of head 42, and hence of fins 28, causes said fins to create a low pressure zone within casing 8, whereby air is drawn from the atmosphere through slots 34 and passed into and through casing 8, and aroung the motor 10, and expelled through the space 38 between flange 30 and cutting head 42. This circulation of air sufficiently cools motor 10 to provide maximum efficiency and minimal ambient heat rise. Moreover, the openings 34, are sufficiently removed from the cutting area that cut grass or other debris flung up by line 26 is not likely to enter openings 34 along with the air.

As hereinbefore stated and further depicted in FIG. 1, the ideal embodiment of this invention features an electric motor 10. The fundamental concept of a permanent magnet motor assumes the presence of a first electromagnetic field, which is generated by the magnet (or magnets) and which is therefore fixed both as to intensity and position, and a second electromagnetic field which is generated by a winding rotatably positioned in the first field. The intensity of the second field is functionally related to the magnitude of the amperage, the AC current which energizes the winding, and since the actual amount of amperage in any AC current at any given time is a function of its frequency, it will be apparent that the intensity of the second field is a function of the frequency of the AC current as well.

The amount of force required to rotate the winding is a function corresponding to the product of a constant and quantity which, in turn, may be stated as a fraction wherein the numerator is the product of the intensities of the two fields, and wherein the denominator is the distance between attracting poles of the fields. Initially, this force is at a maximum, not only because the distance between the two attracting poles is at a maximum, but also because of inertia. Thus, the winding will draw a maximum current flow to effect initial rotation. Since the frequency of the energizing AC current is fixed, however, it will be apparent that, after the winding begins to rotate, the distance between the poles will tend to decrease as each pulse of current arrives at the winding. This, in turn, not only tends to accelerate rotation of the rotor or armature of the motor, but it also tends to decrease the amount of current required by the winding to effect such rotation. Accordingly, the difference between the intensities of the two fields is greatest upon start-up, but this difference decreases thereafter until the intensity of the field generated by the winding approximates the intensity of the field generated by the permanent magnets in a motor of this type such as depicted in FIG. 1 generally at 10.

The intensities of these two fields will never become exactly equal, since a sufficient difference must continue to exist to overcome the effect of friction. However, it will be apparent that the amount of current required by the winding under these conditions will be a function of this difference, and that the amount of current being drawn by the winding will be smallest when the difference in intensities is at a minimum.

As hereinbefore stated, the intensity of the second field is also a function of the frequency of the energizing current. It will be apparent that since the amperage rises and falls in the winding as a function of the sinusoidal configuration of the AC input current, and since it is the rise of such amperage which produces the turning force on the winding, the winding will tend to accelerate in rotational velocity as the amperage rises in it. Since the amperage also follows a sinusoidal pattern of rise and fall, and since a reversal of polarity in the winding would oppose its rotation, it is conventional to rectify the input AC current so as to eliminate all "negative" pulses. Decrease in amperage does not retard acceleration of the winding, of course, provided it does not effect a reverse of polarity, but it does not assist acceleration. Accordingly, it will be apparent that acceleration of the winding, and a decrease in the distance between the poles, will continue until a time factor is achieved which corresponds to the peak of the current pulses. At this point, a state of equilibrium is achieved which is commonly referred to as the "terminal velocity" of the motor.

It will be apparent at this point, that the current required to maintain this equilibrium is now stabilized at a minimum value, and that the force required to effect rotation of the winding at "terminal velocity" is also at a minimum, as long as the other parameters (amperage, frequency, load on the motor, etc.) are maintained as constants. It will further be apparent, that if the frequency of the input current is increased, the time factor will also change so as to further decrease the distance which exists between attracting poles upon the occurence of each current pulse. The motor will then increase its RPM until this new higher "terminal velocity" is achieved. It should also be noted, however, that this increase in velocity is accompanied by a proportional decrease in the amount of current required by the winding.

Referring again to the force being required to turn the winding, it should be noted that the amount of force (or torque) being delivered by the motor shaft 36 is inversely proportional to the force required to turn the rotatable winding. Thus, the delivered torque is smallest upon initial actuation of the motor, and is greatest when the motor achieves "terminal velocity". Furthermore, it will be apparent that an increase in the frequency of the current energizing the rotatable winding will produce an increase in delivered torque which is far out of proportion to the increase in current required by the motor.

As hereinbefore stated, it is conventional for AC current to be rectified before being applied to a permanent magnet motor, in order to eliminate all pulses of unwanted polarity. It will be apparent that such "half-wave" rectification results in elimination of half of all of the current pulses composing the AC power signal available, but this is not deemed significantly detrimental in most applications wherein simplicity and economy of design is of paramount importance.

The cutting line 26 may be composed of a variety of suitable materials as, for example, an elastoplastic extrusion which has been stretched to align the molecules axially. An example of such line is a nylon monofilament of the type commonly used for fishing line. However, other lines may be used, as for example, yarn, cord, rope, twine, braided line, or monofilament, whether described as elastoplastic, elastomeric, natural fiber, or synthetic fiber, and whether compounded of several materials. Nevertheless, there are certain parameters within which the line must fall in order to be effective.

The cutting line 26 should preferably have sufficient fatigue, abrasion, impact resistance, and tensile strength to allow a reasonable service life, and should have as small a diameter as is consistent with the foregoing parameters so that the sharpest cutting edge is provided for effecting cutting of the grass, weeds, or the like. The line 26 should further preferably be as light-weight as possible, so that when the line shears or breaks during use and pieces are thrown from the cutting head 42, such pieces will travel only a limited distance and will strike persons or other objects in the immediate vicinity with little or no appreciable impact.

Cutting may be achieved with line 26 formed of a metal material, and such lines may have a greater tensile strength than if formed of nylon or the like. Metallic lines are more subject to breakage because of fatigue, however, and the relatively greater mass of a piece of metal cutting line will cause it to travel like a projectile for a considerable distance if breakage occurs. In addition to this dangerous feature, the fact that the greater mass of a metallic line requires a larger, heavier motor 10 of greater power makes the use of metallic line 26 undesirable for present purposes. On the other hand, the relatively small mass of a line formed, for example, of an extruded nylon monofilament, creates complex design problems which must be effectively solved to achieve effective cutting of lush vegetation, and this will become even more apparent when it is recognized that only the last one full inch or so of the line 26 actually impacts against the vegetation sought to be cut.

In view of the above, and in further regard to the theory of the invention, it should be understood that in a rotating system as above described, the tip impact has been found to be a function of the mass of the tip of the flexible line member 26 and the tip velocity thereof. This tip impact parameter has been found useful in determining the effectiveness of the cut produced when using the disclosed type cutting device. Thus, it has been found that the higher the tip impact, the better and more effective the cut. Conversely, as the tip impact decreases, due to variation of one of tip mass and tip velocity, the quality and effectiveness of the cut likewise is lowered. In order to understand the relationship of tip impact being a function of tip mass and tip velocity, each of the latter two must be considered separately as will be set forth hereinafter.

Thus, it has been determined that tip mass is a function of the mean cross-sectional diameter of the line member 26 and the mass of the material of construction of said line member. Since it is contemplated, as above set forth, to construct the line member of a material such as nylon, it will be apparent that this light-weight type of material will possess a very small mass. Thus, in its relationship to tip mass, the mass of the material of the line member will be negligible. Therefore, it will be readily seen that the primary factor determining tip mass is the mean cross-sectional diameter of the line member. Hence, when speaking in terms of tip mass, it should be clear that this term is considered to include primarily the mean cross-sectional diameter of the line member and with little or no emphasis upon the mass of the material of which the line member is made.

As hereinbefore explained, tip impact is a function of tip mass and tip velocity, tip mass being essentially the mean cross-sectional diameter of the line member. Considering tip velocity, it has been found that this feature of the tip impact is a function of each of the following four parameters:

(1) the mean cross-sectional diameter of the line member,
(2) the length of the line member,
(3) the diameter of the head 42, and
(4) the RPM of the motor shaft.

A variation of any one or more of the above four factors will obviously vary the tip velocity, and therefore vary the tip impact feature. Thus, tip velocity will change as the diameter of the line member 26 is increased or decreased, as the line member is shortened or lengthened, as the size of the head is increased or decreased, and as the speed of the motor 10 is raised or lowered. In order to understand how each of these factors affects tip velocity, it is necessary to consider each one in its relationship to the other and in its function in the particular vegetation cutting environment.

Referring to the mean cross-sectional diameter of the line member, this factor has been found to have an effect upon tip velocity due to a phenomenon known as "windage". Thus, as the line member 26 is rotated, it encounters the resistance of air. It will be apparent that the resistance of air to the passage of the rotating line member causes a drag on the line member. Hence, the greater the diameter of the line member, the greater is the drag. Conversely, smaller diameter line members create less drag. Thus, variation of the diameter of the line member varies the "windage" or drag factor, which in turn varies the tip velocity, thereby changing the tip impact.

With reference to the length of the line member, this factor contributes in some degree to the "windage" phenomenon noted above. Thus, a given length of line member of a specified cross-sectional diameter will encounter the resistance of air as it is rotated. The resultant drag on the given length of line member will remain constant as the length of line member 26 remains the same. If, however, the line length is increased, a greater drag factor is produced. If, on the other hand, the length of line is decreased, drag is reduced, tip velocity is increased, and tip impact is improved, resulting in a better cut. It should, in addition, be noted that the relationship between the length of the line member and its cross-sectional diameter contribute to the windage or drag factor. Thus, to minimize windage or drag, it should be apparent that a line member of the shortest effective length and the smallest effective mean cross-sectional diameter be employed. These minimum requirements present the least amount of surface area subject to the resistance of air during rotation, and therefore create the least amount of drag.

In addition to drag, the length of the line member 26 also has an additional effect upon tip velocity, partially due to the nature of the line member itself. Thus, under normal operating conditions, the line member will be extended radially outwardly in a more or less straight fashion, thereby utilizing its total actual length. This is due to the centrifugal force generated upon rotation of the line member, which force acts to straighten out the flexible line member. However, if during the operation of the device, the resistances of air and/or grass against the line member 26 are sufficient to overcome the centrifugal force tending to straighten out the flexible line along its axial length, the line member at its outermost portion will tend to trail behind that portion of the line member attached to head 42. This trailing effect is due to the flexible nature of the line member itself, as well as to the resistances encountered. Needless to say, any trailing of the tip portion of the line member behind the portion of the line attached to the head, reduces the effective overall length of the line member, thereby reducing the tip velocity which in turn reduces tip impact. In rather extreme cases of trailing, the lag of the tip of the line member will be such as to provide an arcuate shape to the line member 26 rather than a substantially straight line extension as is desired.

Referring now to the head diameter factor and its relationship to the tip velocity, it should be understood that the head 42 supports a portion of the line member. Thus, to theoretically determine the exact length of the line member factor, the radius of the head must be taken into account. For practical purposes, therefore, line length is actually the length of exposed line, that is, the length of line measured from the circumference of the head to the tip of the line member, plus a distance equal to the radius of the head. Obviously, a change in the size of the head 42 will therefore affect the tip velocity due to its contributing a radial length to the line member itself.

In addition to line member length affect, head diameter affects tip velocity due to its mass. For example, assuming identical materials of construction of the head, it will be apparent that a head 42 of large diameter will of necessity weigh more than a head of small diameter. Since mass constitutes a load on the motor 10, any variation of mass of the head will vary the motor load which, in turn, will vary tip velocity and tip impact. Therefore, it should be apparent that the selection of the materials of construction of the head and the particular head diameter selected are important factors in arriving at an assembly for effectively and efficiently cutting vegetation.

Considering the RPM of the motor 10 and the shaft 36 and its effect upon tip velocity and, therefore, tip impact, it should be noted that any decrease in RPM will reduce tip velocity. Conversely, a better tip velocity is achieved as RPM increases. Primarily of concern is the RPM decrease and the factors contributing thereto. Given a preselected motor design of specific RPM rating, it will be apparent that this particular RPM rating may be decreased by variation in system design. Thus, any change in the load on the motor and shaft will affect RPM. For example, an increase in mass will decrease the RPM. A larger diameter head, of greater mass, will put a greater load on the shaft, thereby affecting RPM. A line member 26 of greater length and/or greater mean cross-sectional diameter will also add mass to the system and therefore increase the load on the motor shaft, thus affecting RPM and tip velocity and impact, but to a lesser extent. Another load factor on the motor and shaft tending to affect RPM is the result of windage or drag. As set forth above, this resistance phenomenon is a function of the length of the line member and the cross-sectional diameter of same. Thus, to maintain a minimum of drag results in a substantially lessened effect upon load, thereby reducing drag as a factor in RPM variation. With reference to the trailing effect of the line member as noted above, it should be understood that the RPM of the motor and shaft must be sufficient to impart enough of a centrifugal force to the line member to maintain the line member in a substantially straight line relationship rather than the somewhat arcuate-shaped configuration produced when resistances are encountered.

It should therefore be apparent, that numerous factors and interrelationships therebetween are involved in arriving at an effective and efficient vegetation cutting assembly of the flexible line member type. The design parameters and selection of same are complex since many are dependant one upon the other, and therefore critical. Thus, it will be seen that more is involved herein than just merely rotating a flexible nylon string.

As hereinbefore mentioned, the cutting effectiveness is a function of the weight of the line 26 as well as its tip velocity, and thus, it has been determined that in a preferred embodiment of the present invention, the line will be formed of a material having a specific gravity of not substantially less than 0.90 nor substantailly greater than 1.60 and preferably 1.18. Since cutting is effected by substantially only the last half inch or so of the line, it may be stated that the line should be of a dimension such that the cutting portion of line 26 has a kinetic energy of not substantially less than 0.03 foot-lbs., nor substantially more than 7.14 foot-lbs., when the equipment is in operation. Using the Kinetic Energy formula:

$$KE = \tfrac{1}{2} mv^2$$

Wherein $m$ is the mass of the last half inch of a 0.080 diameter cutting line and of a density of 1.18 gm/cm$^3$, and wherein $v$ is the tip velocity of 25,120 ft./min., the kinetic energy computed is 0.188 foot-lbs., clearly within the parameters 0.03–7.14 foot-lbs., hereinbefore set forth.

Figure 4:
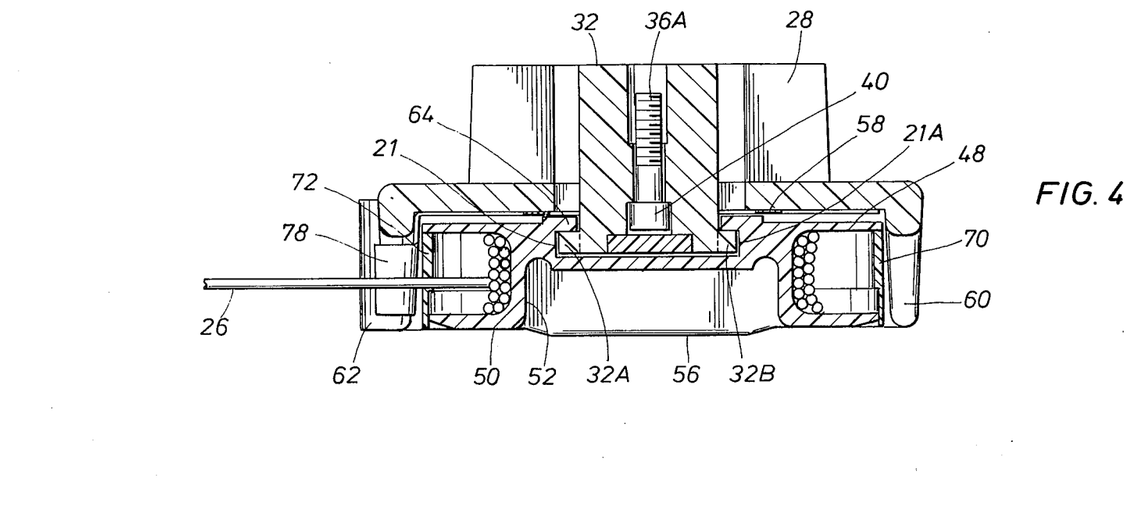
FIG. 4 is a cross-sectional view of the head assembly depicted in FIG. 1 in a static or nonrotating position showing the cutting string mounted therein.

Referring now to FIG. 4, it may be seen that the lower end of the drive shaft 36 from motor 10 is arranged for threading engagement with a drive adapter or attachment member 36A. Drive adapter 36A extends downwardly through head 42 and is arranged at its upper extremity for threading arrangement with shaft 36. Drive adapter 36A inserts tightly into head 42 and retains its relationship with head 42 by means of head 40 which is carried within head 42. Rotation of drive adapter 36A by drive shaft 36 causes head 42 to rotate, thereby extending the string 26 to perform a cutting function.

Figure 5:
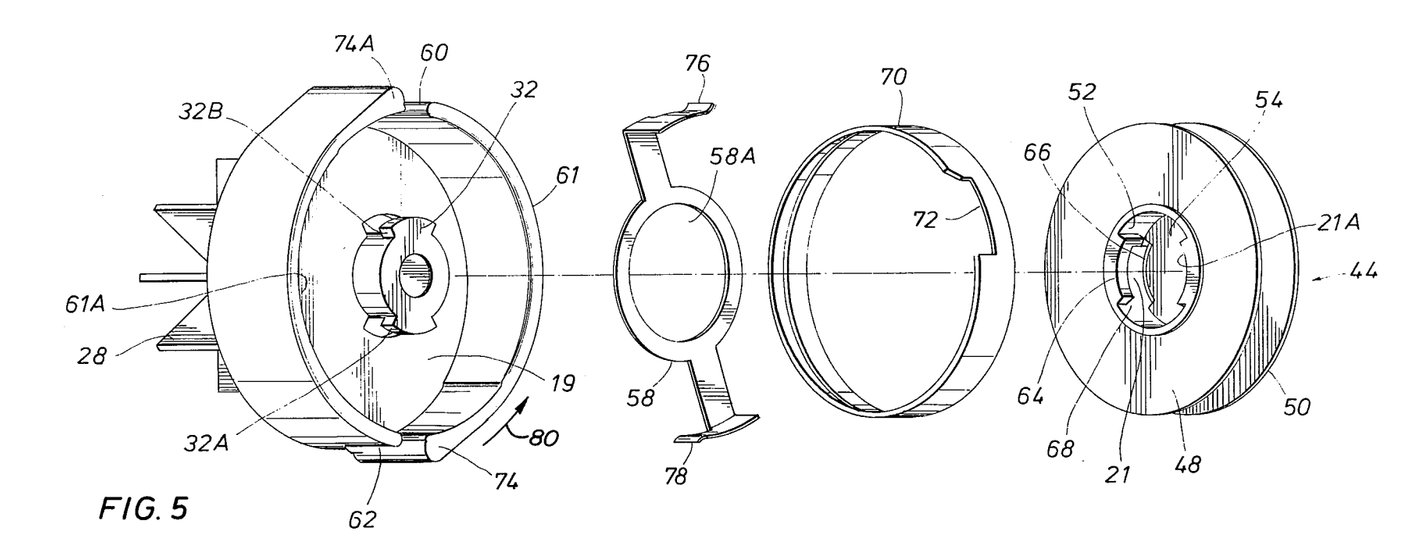
FIG. 5 is an exploded assembly drawing of the head assembly of FIG. 4.

Tab element 32, in addition to housing drive adapter 36A and securing said drive adapter 36A in relationship with head 42 so as to provide axial rotation thereof, also releasably secures spool 44 within head 42 as shown in FIG. 5. Spool 44 contains spare cutting line 46 therein, which is arranged for paying out at predetermined times and at predetermined lengths to vary the effective working length of the cutting line 26. Unlocking of tab element 32 by unthreading it from keyway slots 21 allows removal of spool 44 so that a fresh full spool may be inserted into head 42, or spool 44 may be rewound with replacement line, or the like.

Figure 6:
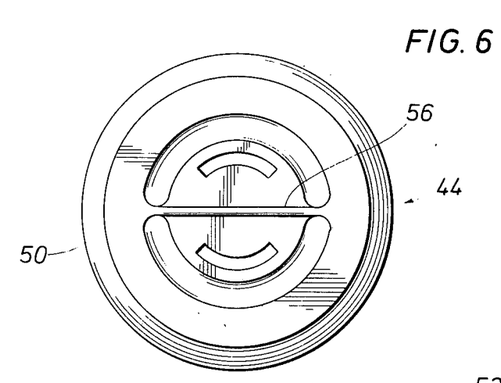
FIG. 6 is a top plan view of the spool depicted in FIG. 5.
Figure 7:
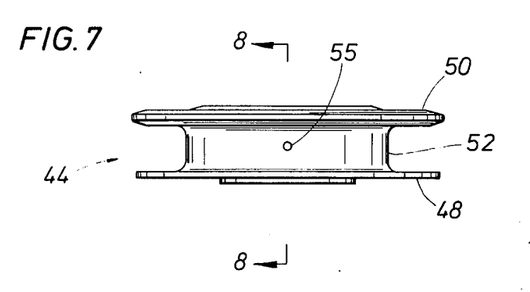
FIG. 7 is a side plan view of the spool depicted in FIG. 5.
Figure 8:
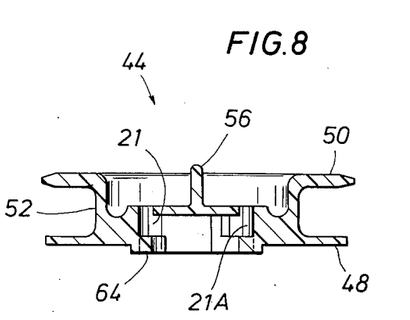
FIG. 8 is a cross-sectional side view of the spool depicted in FIG. 5 and taken along line 8—8 of FIG. 7.
Figure 9:
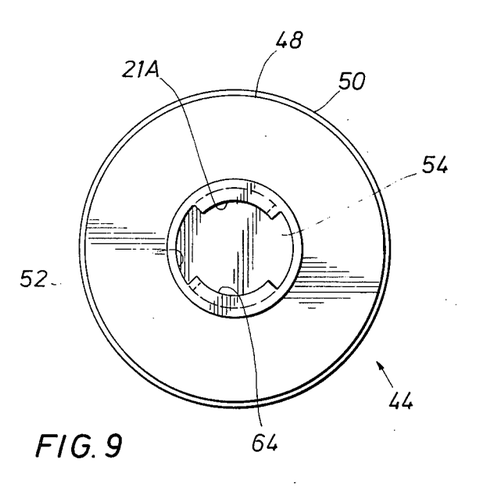
FIG. 9 is a bottom plan view of the spool depicted in FIG. 5.
Figure 10:
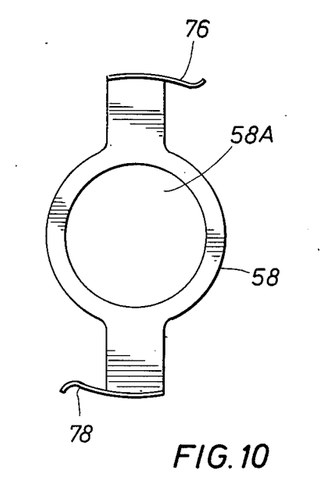
FIG. 10 is a top plan view representation of the unitary bearing element illustrated in FIG. 5.

Spool 44 as seen in FIGS. 5-9 is composed of a bottom wall 48 and a top wall 50 spaced a predetermined distance by hub 52. Interior of hub 52 is an aperture 54 which accomodates keyway elements 21 to fit over tab element 32 and lock spool 44 to head 42 when the spool 44 is placed within head 42. Thus, it will be apparent from FIG. 5, that tab element 32 includes a pair of ears 32A and 32B. Each of ears 32A and 32B are spaced above the wall 19 of head 42. Spool member 44 includes keyway elements 21 and 21A each of which is carried by the hub 52 of the spool 44 and formed integrally therewith. Each keyway will be seen to comprise a pair of inwardly extending flange elements 64 and 66 which define therebetween an open ended slot 68. It should be apparent that when spool 44 is inserted into head member 42, that the slot 68 will be positioned to encompass one of ears 32A-B. As seen in FIG. 6, the top wall 50 of spool 44 includes a radially extending member 56 which may be grasped manually by the thumb and forefinger. Turning of member 56 thereby rotates the spool 44 within head member 42 so as to cause the slots 68 of keyways 21 and 21A to engage and thereby lock with respect to each of the ears 32A-B of tab element 32. This provision of tab 32 and keyways 21 and 21A provides an easy and convenient manner by which spool 44 may be placed within and locked for rotation along with head member 42. To remove the spool 44 from head member 42, it is merely required to turn member 56 in the opposite direction whereby slots 68 of the keyways are unlocked from the respective ears of the tab member 32.

From FIGS. 3, 4 and 5, it is seen that the ears 32 and 32A and flange elements 64 and 66 are semicylindrical flange members aligned coaxially with the rotational axis of head 42 and spool 44. These flange members are angularly spaced from one another and occupy less than the circumference of aperture 54 in the spool 44. As a result, these flange members provide keyways 21 and 21A and the tab ears 32 and 32A, which members are adapted to be axially interfitted as is shown in FIG. 4. Clockwise rotation of the spool 44 relative to the head 42 from the position shown in FIG. 3 provides rotational interlocking between them. Thus, the head and spool are releasably connected into an integral structure and secured against both axial and radial displacement during use of the apparatus.

With reference again to FIG. 5, a guard element is therein depicted which is of circular configuration and of a diameter to fit snugly over the spool walls 48 and 50 and to rest therebetween. The guard element includes an aperture of cut-out portion through which the terminal end of line 26 passes. This guard member 70 functions to thereby prevent the remaining coiled portion of the line 26 on spool 44 from unravelling when the spool 44 is removed from head member 42. In addition, it is contemplated to size the cutout portion 72 of guard 70 such that the amount of material removed will be substantially equal to the mass of the flail section of line member 26. This removal of an equal amount of mass of material from guard element 70 provides for balancing of the unit when rotating. Thus, the mass of the extended flail 26 at one side of the head unit will be offset by that portion of the mass removed to provide the cut-out portion 72.

It may be clearly seen in FIGS. 1 and 4 that in one embodiment, a single line 26 extends from the body of the cutting head 42, and through one of the two window apertures 60 and 62. In the embodiment therein depicted, one end of the line 26 is inserted through aperture 55 in the spool hub 52, (FIG. 7) and then knotted together to prevent disengagement therefrom. The line 26 is then preferably wound about the spool 44, oppositely of the direction of rotation of spool 44 and head 42, and then extended through one of respective window apertures 60 and 62, as hereinbefore stated. The line 26 may be unwound and paid out from the spool 44 without removing the spool 44 from the head 42, by drawing it out of one of respective window apertures 60 and 62 and simply pulling down on the line 26 to the next window aperture, since the top wall 50 of the spool 44 is stiff but resilient. In an alternate embodiment of the present invention, a pair of cutting lines 26 may be provided but no additional structure is required to provide this dual cutting line feature. For example and in light of FIG. 5, the empty spool 44 is wound as above. However, in the dual cutting line embodiment, the line 26 is first doubled along its length thereby providing two free ends. That portion of the line that is doubled is inserted through aperture 55 and knotted as above. The doubled line is then wound onto the spool until the two free travelling ends are reached. Each free end of the line 26 is then extended through one of the respective window apertures 60 and 62, thus providing a head assembly 42 including a pair of cutting strands 26. To extend either of the lines, it is then merely required to pull down on the line as seen in FIG. 4 until that line reaches the next window aperture. Since wall 50 is resilient, the line can be pulled along the space defined by wall 50 and the inner periphery of head 42 until it reaches the next window aperture. The other line may be extended or paid out in similar fashion. In this dual cutting line embodiment, it is contemplated to eliminate the guard member 70, since with the two line members being at diametrically opposed locations, the unit will be balanced in a roational sense, since flails of equal mass will be extended out of each of window apertures 60 and 62.

It has been further been determined that the extended length of the cutting line 26 is also a direct function of the size of the cutting head, although the precise explanation for this is not immediately apparent. In any event, it can be stated that this provides that the cutting line should have a free travelling or unsupported length of not substantially less than 0.50 times the diameter of the cutting head, nor substantially more than 2.2 times such diameter, and this appears to be especially significant in the operation of the embodiment of the invention.

As hereinbefore explained, it is a feature of the present invention to provide against excessive string or line breakage by substantially reducing vibration between the surface of the cutting line 26 and other objects such as bearing portions of the rotary head, or adjacent surfaces of the cutting line itself. Referring now to FIGS. 3–5, the two window apertures 60 and 62 are each composed of a pair of curvilinear and spaced apart solid sidewalls 61 and 61A. In this embodiment of the present invention, the cutting line 26 is composed of a coiled portion 46 (FIG. 4) wound about the spool 44, and a free travelling end portion extending along a tangent thereto outwardly through one of the respective window apertures 60 and 62. Accordingly, the line tends to abut the trailing one of the pair of sidewalls 61 and 61A composing the respective one of the two windows 60 and 62, rather than the sidewall which leads the line as it is carried arcuately about by rotation of the cutting head 42. The head 42 rotates in the direction of arrow 80 as is shown in FIGS. 2, 3 and 5.

As also hereinbefore explained, the cutting line 26 tends to vibrate longitudinally as the cutting head 42 is rotated, and thus to oscillate laterally against the trailing sidewall of one of the windows 60 and 62 in a manner to generate sufficient localized heat to at least partially melt the cutting line at a point along its length where it contacts the said trailing sidewall. The tear-drop portions 74 and 74A minimize such rubbing to some extent by tending to hold the line immobile at these points, but such holding effort as may be exerted by the tear-drop portions 74 and 74A must of necessity be limited so as not to restrict the ease whereby new lengths of the cutting line may be paid out as desired.

It has been found beneficial, therefore, to provide these trailing sidewalls with metallic bearing element inserts 76 and 78 preferably formed of a unitary piece of material which has a reduced tendency to develop friction from engagement with the vibrating cutting line, and further preferably having a smooth or polished surface for carrying the cutting line. These inserts 76 and 78 may be formed in one piece of a variety of different materials which are suitable for such purposes, but it has been found that a polished metal such as brass or stainless steel is especially suitable.

It should be noted, of course, that if the rotary body 42 is itself formed of brass or stainless steel or the like, or if at least that portion of the rotary head 42 which constitutes each trailing sidewall is formed of such material, then there is no need for the inserts 76 and 78 as components in the cutting head 42. For various reasons hereinafter described in greater detail, however, it is highly desirable to form the rotary head 42 and other major components out of a high impact plastic such as Nylon or the like, and although such a material may be provided with sidewalls 61 and 61A having a smooth high gloss finish or surface, a nylon-to-nylon engagement tends nonetheless to develop heat to such an extent as to be much above the melting point of nylon. Thus, it is preferable to form the rotary head 42 of plastic and to eliminate nylon-to-nylon contact by providing a single metal bearing including inserts 76 and 78 as heretofore explained. The bearing element will be seen to include an apertured wall 58 connecting inserts 76 and 78. The aperture 58A is sized to pass over tab element 32 and rest flush with wall 19 of head element 42 so as not to interfere with the locking mechanism 21 and 21A.

It has been determined through usage of the present invention that wherever metal-to-plastic contact can be established at such points of vibrational engagement, reduction or dissipation of unwanted heat is usually, if not always, sufficient to eliminate melting or softening of the cutting line in the manner hereinbefore described. This, of course, is not a practical remedy in those instances wherein vibrational engagement occurs at places such as between adjacent windings of the cutting line 46 (FIG. 4). On the other hand, application of a coating of suitable lubricant to the cutting line 46 will not only overcome this problem completely but will also further reduce vibratory engagement and insulate those points wherein metal-to-plastic contact has also been achieved by means of the aforementioned inserts 76 and 78 or the equivalent.

As hereinbefore stated, any of several materials may be employed as a heat insulating lubricant for this purpose, and as also previously stated, common petroleum jelly has been found to be entirely satisfactory. Any of many other substances of suitable viscosity may be employed as a lubricant, however, provided such lubricant will insulate and adhere to the surface of the cutting line 46 whereby the entire line is adequately coated and insulated at all times.

With reference agains to FIG. 5, a further feature of the present invention includes means whereby the head may be balanced rotationally so as to not transmit unwanted vibrations to the motor shaft 36. Thus, to provide a smooth running and rotationally balanced head assembly 42, it is necessary to offset the weight attributable to the line 26 extending outwardly of one of window apertures 60 and 62. If, for example, as depicted in FIG. 4, a single cutting line passes outwardly of the periphery of head 42 via aperture 62, the mass of the peripherally extending portion of the line 26 will unbalance the head 42 in a rotational sense. Thus, the head at point 62 will include a mass that is not offset by a corresponding mass at a location diametrically opposite point 62. To overcome this deficiency, and with reference to FIG. 5, there will be seen guard 70 with cut-out 72. When the head 42 is assembled for grass cutting operation and includes therein a full spool of line 26, the line is inserted into one of apertures 60 and 62. The line extends outwardly of one of these apertures and acts as a flail to cut vegetation. Normally, a three inch length of line 26 is used for cutting operations. However, as noted above, it is this three inch section of line that causes head 42 to rotate in an unbalanced condition. It is therefore the function of the cut-out 72 to offset this mass of the three inch flail. This is accomplished by constructing the cut-out portion 72 to be of an amount of material equal in weight to the mass of the extended three inch flail section of line member 26. This weight of the removed cut-out portion 72 will vary from unit to unit depending, of course, upon variable factors such as line diameter, line density, length of the flail portion of the line, and the particular materials of construction of the head 42, cutting line 26, and guard member 70. Sufficient to say, however, that the guard 70 includes a cut-out 72 of a mass equal or substantially equal to the mass of the extended cutting flail portion of line 26.

In a preferred embodiment of the present invention, it has been determined that an effective length-to-diameter ratio for a nylon monofilament line or the like, will often be greater than 20:1 and is preferably about 35:1 for present purposes. It has further been found that the best cutting line for the purposes of this invention are extruded nylon line, having a diameter of about 0.060 inches to about 0.125 inches, with 0.065 inches being preferred. The normal rotating speed will be on the order of 10,000–14,000 RPM, with 12,000 RPM being preferable during normal use of the equipment.

It has been determined that for the embodiment disclosed herein, the optimum parameters call for a cutting length (the length extending beyond the periphery of the cutting head) of substantially 2-4 inches, with a cutting length of about 2.3 inches being preferred. A head diameter of about 3.4 inches is desirable, thus providing a cutting path of about 8.0 inches, although cutting heads of substantially larger or smaller diameters are contemplated herein.

In a more precise relationship, the optimum RPM is preferably stated in terms of tip velocity (since it is the terminal inch of each line that is effective for present purposes), and thus may be stated as follows:

$$V_{max} = \frac{27,000}{\sqrt[16]{d}}$$

or $$V_{max} = \frac{27,000}{d^{0.063}}$$

wherein V is the tip velocity of the cutting line in feet per minute, and $d$ is the cross-sectional diameter in inches of a monofilament extruded nylon line.

Accordingly, if the line 26 has a diameter of 0.080 inches, the maximum velocity should not exceed 32,000 feet per minute. This tip velocity is computed according to the above set forth relationship of $V_{max}$. The following table of the sixteenth roots of the various cord sizes ($d$) has been found useful in the computations:

| d | $\sqrt[16]{d}$ |
|---|---|
| .010 | .7499 |
| .015 | .7692 |
| .020 | .7832 |
| .025 | .7940 |
| .030 | .8032 |
| .035 | .8110 |
| .040 | .8178 |
| .045 | .8238 |
| .050 | .8293 |
| .055 | .8342 |
| .060 | .8388 |
| .065 | .8430 |
| .070 | .8469 |
| .075 | .8506 |
| .080 | .8540 |
| .085 | .8572 |
| .090 | .8603 |
| .095 | .8631 |
| .100 | .8658 |
| .105 | .8680 |
| .110 | .8711 |
| .115 | .8735 |
| .120 | .8959 |
| .125 | .8782 |
| .130 | .8803 |
| .135 | .8824 |

It should be understood that, regardless of the particular configuration of any of the various forms of the particular invention, the free traveling end of any cutting line will preferably be swung in the cutting plane at a tip velocity such that such end will tend to stand rigidly out from the periphery of the cutting head. Hence, the line end will experience a shock whenever the line end impacts any object in the cutting plane, and also whenever the free traveling end is caused to whip or backlash about the periphery of the cutting head. The magnitude of this shock will, of course, be affected substantially by whether the impacted object is yielding or unyielding, and whether it is severable. Hence, when the cutting line has a tip velocity within the range hereinbefore prescribed, and when it strikes an unyielding and unseverable object, such as a fence or wall or the like, the resulting shock is sufficiently great to cause breakage if concentrated at one point along the line.

As hereinbefore explained, it is a feature of the invention depicted herein to provide that the shock of such impact be distributed as much as possible along the length of the cutting line, since concentration of such shock at any point will greatly enhance the chances that the cutting line will experience fracture or breakage. Accordingly, provision is made whereby the extended portion of the cutting line extends along a path lying only in the cutting plane, and whereby provision is made for distribution of such shock along as great a portion of the cutting line as possible. In particular, provision is made whereby the cutting line does not contact any trailing portion of the cutting head during rotation, and whereby it abuttingly contacts only a leading portion of the head. Thus, if the line strikes an unyielding object, the line will at least momentarily be pushed back out of contact with this leading portion of the cutting head, and since the line is momentarily out of contact with any adjacent portion of the apparatus, the shock will tend to be distributed over a greater portion of the length of the impacted cutting line.

If the impact is great enough, or if the impacted object is so unyielding as to cause the line to backlash about the periphery of the cutting head, then the extended portion of the cutting line will then be contacted by one of the trailing surfaces or other portions of the revolving cutting head. The line will then experience a shock while contacting this trailing portion of the cutting head, if the line strikes another object while still deformed. If the contacted trailing portion of the head has a sufficiently large radius of curvature (as at 74 and 74A in FIG. 5, for example), however, the chances are improved that the shock will be distributed enough to avoid or minimize damage to the line.

If the line is backlashed about the periphery of the cutting head, of course, the line will not then strike any object in the cutting plane except the head itself. The shock from the backlash will, however, often cause line breakage unless provision is made in one or more of the ways hereinbefore discussed, whereby such backlash is about a surface or surfaces having at least a minimum radius of curvature, and whereby the shock of impact is thereby distributed over as much of the length of the line as is possible. In any event, it is exceedingly desirable, if not absolutely essential, that the line not be permitted to experience any angular deformation at any point along its length.

It will thus be apparent, that this invention provides the art with a cutting device which can quickly, easily, and efficiently cut grass, weeds, and the like; over, under, around, and between rocks, culverts, and the like; and can cut around and between trees, posts, bushes, buildings, and other stationary objects, or the like. Further, this apparatus will be particularly safe for both the operator and others in the vicinity, in that the hazardous conditions present when prior art devices are used have been essentially eliminated. By making the apparatus available in a portable embodiment, the cutting plane can be effected in any direction so as to accommodate both cutting and trimming operations as heretofore described, thereby eliminating the need for manual labor in certain difficult cutting operations.

The apparatus of this invention can also be used successfully in yard trimming and cleaning operations where there is considerable debris, such as bottles, cans, papers, wood, wire and the like, without creating a dangerous condition in that the cutting elements of this device do not create missiles of such trash. Because of the nature of the cutting element of this invention, such objects are not thrown, but rather the cutting string acts in a resilient fashion, so as not to impart sufficient force to such objects to become missiles; or if they are thrown, they are projected at only a very low velocity as compared with cutting devices heretofore in use. Experience has shown that in operating an apparatus of this device with line of the type described, the cutting line may accidentally come in contact with the operator's shoes, articles of clothing, or the like, without serious injury as would be the case with prior art devices.

It will be apparent from the foregoing that many other variations and modifications may be made in the structures described herein without departing substantially from the essential concept of the present invention. Accordingly, it should be clearly understood that the forms of the invention described herein and depicted in the accompanying drawings are exemplary only and are not intended as limitations in the scope of the present invention.

What is claimed is:

1. Apparatus for cutting vegetation and the like, comprising:

head means rotatable about a rotational axis in a cutting plane and having a concentrically located open-end storage portion for a spool means and a peripherally located support portion having a solid curvilinear bearing surface, said curvilinear bearing surface of said head means including a teardrop-shaped section extending outwardly with respect to the periphery of said head means, driving means for rotating said head means in said cutting plane, a flexible non-metallic line member having a coiled portion in said storage portion of said head means and further having an uncoiled portion extending from said coiled portion into said cutting plane to and across said bearing surface and further continuing radially outwardly from the periphery of said head means, spool means insertable in said storage portion of said head means through the open end and holding said coiled portion of said line member in said head means, said spool means including a keyway associated therewith, tab means on said head means in said storage portion, said keyway and tab means provided by semi-cylindrical flange members coaxial with said rotational axis and said semi-cylindrical flange members adapted to be axially interfitted and rotationally interlocked whereby an axially and radially secure interconnection is provided between said spool means and head means.

2. The apparatus described in claim 1 including a guard member in surrounding relationship to said spool means, said guard member including an aperture therein through which said line member passes.

3. Apparatus for cutting vegetation and the like, comprising:

head means rotatable in a cutting plane and having a concentrically located storage portion for spool means and a peripherally located support portion having curvilinear bearing surfaces defining at least two peripheral apertures, driving means for rotating said head means in said cutting plane, a flexible non-metallic line member having a coiled portion in said storage portion of said head means and further having an uncoiled portion extending from said coiled portion in said cutting plane to and through at least one of said peripheral apertures and further continuing radially outwardly from the periphery of said head means, spool means insertable in said storage portion of said head means and holding said coiled portion of said line member in said head means, and a unitary metallic bearing element including portions in abutting relationship to the curvilinear bearing surfaces of each of said peripheral apertures.

4. The apparatus described in claim 3 wherein said unitary metallic bearing element includes a section extending generally parallel to said cutting plane.

5. The apparatus described in claim 4 wherein said abutting portions of said unitary metallic bearing element extend generally perpendicularly to said cutting plane.

6. The apparatus described in claim 3 wherein the peripherally located support portion of said head means is solid.

7. The apparatus described in claim 6 wherein said curvilinear bearing surfaces of said head means include teardrop-shaped sections extending outwardly with respect to the periphery of said head means.

8. The apparatus described in claim 3 including a guard member in surrounding relationship to said spool means, said guard member including an aperture therein through which said line member passes.

9. The apparatus described in claim 3 wherein said head means includes a plurality of upstanding and radially extending fin members.

10. Apparatus for cutting vegetation and the like, comprising:

head means rotatable in a cutting plane and having a concentrically located open-ended storage portion for spool means and a peripherally located support portion having curvilinear bearing surfaces defining at least two peripheral apertures, driving means for rotating said head means in said cutting plane, a flexible non-metallic line member having a coiled portion in said storage portion of said head means and further having an uncoiled portion extending from said coiled portion in said cutting plane to and through at least one of said peripheral apertures and further continuing radially outwardly from the periphery of said head means, spool means insertable in said storage portion of said head means through the open end and holding said coiled portion of said line member in said head means, said spool means including a keyway associated therewith, tab means on said head means in said storage and cooperating with said keyway to lock said spool means in said storage portion of said head means, and a unitary metallic bearing element including portions in abutting relationship to the curvilinear bearing surfaces of each of said peripheral apertures.

11. The apparatus described in claim 10 wherein the tab means are integrally united to said head means.

12. The apparatus described in claim 10 wherein said unitary metallic bearing element includes a section extending generally parallel to said cutting plane.

13. The apparatus described in claim 12 wherein said abutting portions of said unitary metallic bearing element extend generally perpendicularly to said cutting plane.

14. The apparatus described in claim 10 wherein the peripherally located support portion of said head means is solid.

15. The apparatus described in claim 14 wherein said curvilinear bearing surfaces of said head means include teardrop-shaped sections extending outwardly with respect to the periphery of said head means.

16. The apparatus described in claim 10 including a guard member in surrounding relationship to said spool means, said guard member including an aperture therein through which said line member passes.

17. The apparatus described in claim 10 wherein said head means includes a plurality of upstanding and radially extending fin members.

18. As a subcombination head means rotatable in a cutting plane and having tab means associated therewith and a peripherally located support portion having curvilinear bearing surfaces defining at least two peripheral apertures, a flexible non-metallic line member having a coiled portion arranged in said head means and further having an uncoiled portion extending outwardly of the periphery of said head means through at least one of said peripheral apertures, and a unitary metallic bearing element including portions in abutting relationship to the curvilinear bearing surfaces of each of said peripheral apertures.

19. The subcombination described in claim 18 wherein said unitary metallic bearing element includes a section extending generally parallel to said cutting plane.

20. The subcombination described in claim 19 wherein said abutting portions of said unitary metallic bearing element extend generally perpendicularly to said cutting plane.

21. The subcombination described in claim 18 wherein said curvilinear bearing surfaces of said head means include teardrop-shaped sections extending outwardly with respect to the periphery of said head means.

22. The subcombination described in claim 18 further comprising spool means removably insertable in said head means for supporting said coiled portion of said line member in said head means.

23. The subcomination described in claim 22 wherein said spool means includes a keyway cooperating with said tab means of said head means for locking said spool means in said head means.

24. The subcombination described in claim 23 including a guard member in surrounding relationship to said spool means, said guard member having an aperture therein through which said line member passes.

* * * * *